(12) United States Patent
Kato (10) Patent No.: US 11,237,524 B2
(45) Date of Patent: Feb. 1, 2022

(54) TIMEPIECE, ELECTRONIC DEVICE, AND METHOD OF DETERMINING ILLUMINANCE OF TIMEPIECE

(71) Applicant: Seiko Instruments Inc., Chiba (JP)

(72) Inventor: Kazuo Kato, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 691 days.

(21) Appl. No.: 16/135,600

(22) Filed: Sep. 19, 2018

(65) Prior Publication Data

US 2019/0086874 A1  Mar. 21, 2019

(30) Foreign Application Priority Data

Sep. 21, 2017 (JP) .............................. JP2017-181684
Sep. 12, 2018 (JP) .............................. JP2018-170507

(51) Int. Cl.
G04G 19/08 (2006.01)
G04C 10/02 (2006.01)
G01J 1/42 (2006.01)
H02S 40/38 (2014.01)
G04C 10/04 (2006.01)

(52) U.S. Cl.
CPC ............. *G04C 10/02* (2013.01); *G04G 19/08* (2013.01); *G01J 1/42* (2013.01); *G04C 10/04* (2013.01); *H02S 40/38* (2014.12)

(58) Field of Classification Search
CPC .......... G04B 7/009; G04B 1/00; B60R 16/03; G04C 10/00; G04C 10/02
See application file for complete search history.

(56) References Cited

U.S. PATENT DOCUMENTS

| 7,388,812 | B2 * | 6/2008 | Nakamura | ............. | G04G 21/04 368/47 |
| 9,092,015 | B2 * | 7/2015 | Kato | ...................... | G04G 19/06 |
| 2005/0157592 | A1 * | 7/2005 | Nakamura | ............. | G04R 20/08 368/47 |
| 2013/0188460 | A1 * | 7/2013 | Ihashi | .................... | G04B 99/00 368/66 |
| 2013/0194896 | A1 * | 8/2013 | Kato | ...................... | G04B 99/00 368/66 |
| 2013/0194897 | A1 * | 8/2013 | Kato | ...................... | G04B 99/00 368/66 |
| 2018/0276971 | A1 * | 9/2018 | Nagata | .................. | H04W 92/10 |

FOREIGN PATENT DOCUMENTS

| JP | S56-97795 U | 8/1981 |
| JP | S61-077788 A | 4/1986 |
| JP | 2013-134167 | 7/2013 |

* cited by examiner

*Primary Examiner* — Sean Kayes
(74) *Attorney, Agent, or Firm* — Crowell & Moring LLP (57) ABSTRACT

Provided is a timepiece including a solar cell that has a solar panel, a secondary battery that is charged from the solar cell, an overcharge prevention circuit that detects a charged state of the secondary battery, and a control unit that short-circuits the solar cell and determines that illuminance of light illuminating the solar panel is equal to or higher than predetermined illuminance in a case where the overcharge prevention circuit is detected to be in an overcharge state.

5 Claims, 6 Drawing Sheets

TIMEPIECE, ELECTRONIC DEVICE, AND METHOD OF DETERMINING ILLUMINANCE OF TIMEPIECE

RELATED APPLICATIONS

This application claims priority under 35 U.S.C. § 119 to Japanese Patent Application Nos. 2017-181684 filed on Sep. 21, 2017 and 2018-170507 filed on Sep. 12, 2018, the entire content of which are hereby incorporated by reference.

BACKGROUND OF THE INVENTION

1. Field of the Invention

The present invention relates to a timepiece, an electronic device, and a method of determining illuminance of a timepiece.

2. Description of the Related Art

There are timepieces in which a secondary battery is charged with electric power generated by a solar cell and which is driven by the charged electric power. Such timepieces have an overcharge protection circuit to prevent an overcharge of the secondary battery. In addition, in a timepiece having a solar cell, if illuminance of light illuminating the solar cell is low, power is not sufficiently generated, so that the timepiece cannot be driven.

Therefore, for example, JP-UM-A-56-97795 discloses a technology in which a display output from a driver circuit of a liquid crystal panel is blocked when an output of a solar cell becomes equal to or smaller than a predetermined value.

In addition, JP-A-61-77788 discloses a technology in which a time display operation stops when incident light cannot be continuously obtained for a certain period of time or longer.

In addition, in timepieces having a solar cell and a secondary battery, in regard to whether or not illuminance of light illuminating the solar cell is sufficient, there are timepieces including an illuminance detection circuit that detects whether or not illuminance is sufficient by detecting a voltage of a solar cell (for example, refer to JP-A-2013-134167). In such timepieces, some of them switch over to a power saving mode in a case where a solar cell is insufficiently illuminated. Here, a power saving mode indicates an operation mode in which displaying is not performed in a case where a display unit of a timepiece is constituted of a liquid crystal panel or an operation mode in which intervals of hand operations are lengthened in a case where a display unit of a timepiece is constituted of an indicating hand.

In a case where a secondary battery is fully charged with electric power generated by a solar cell, an overcharge protection circuit is turned on to prevent an overcharge of the secondary battery. If the overcharge protection circuit is turned on, electrodes of the solar cell are short-circuited.

However, in technologies in the related art, in a timepiece having a solar cell and a secondary battery, when an overcharge protection circuit is turned on and electrodes of the solar cell are short-circuited, a detection value of another circuit (for example, an illuminance detection circuit) in the timepiece becomes lower than an actual value. Therefore, in technologies in the related art, it becomes difficult to accurately detect a power generation state of a solar cell. As a result, in technologies in the related art, there have been cases where, even if illuminance is equal to or higher than predetermined illuminance, it may be erroneously determined to be lower than the predetermined illuminance and controlled to be in a power saving mode. The state where the overcharge protection circuit is turned on indicates that the secondary battery is in a state close to a full charge.

SUMMARY OF THE INVENTION

It is an aspect of the present application to provide a timepiece in which a power generation state of a solar cell can be accurately detected even if a secondary battery is in an overcharge state close to a full charge, an electronic device, and a method of determining illuminance of a timepiece.

According to the aspect of the present application, there is provided a timepiece (1) including a solar cell (G) that has a solar panel, a secondary battery (E) that is charged from the solar cell, an overcharge prevention circuit (20) that detects a charged state of the secondary battery, and a control unit (104) that short-circuits the solar cell and determines that illuminance of light illuminating the solar panel is equal to or higher than predetermined illuminance in a case where an overcharge state of the overcharge prevention circuit is detected.

In addition, the timepiece according to the aspect of the present application may further include an illuminance detection circuit (30) that detects whether or not illuminance of light illuminating the solar panel is equal to or higher than the predetermined illuminance based on voltage values at both ends of the solar panel. The solar cell, the overcharge prevention circuit, and the illuminance detection circuit may be connected to each other in a parallel manner. In a case where the overcharge prevention circuit is detected not to be in an overcharge state, the control unit may determine whether or not illuminance of light illuminating the solar panel is equal to or higher than predetermined illuminance based on a detection value detected by the illuminance detection circuit.

In addition, in the timepiece according to the aspect of the present application, in a case where the overcharge prevention circuit is detected not to be in an overcharge state, the control unit may determine that illuminance of light illuminating the solar panel is equal to or higher than predetermined illuminance in a case where a detection value detected by the illuminance detection circuit is equal to or greater than a predetermined value, and the control unit may determine that illuminance of light illuminating the solar panel is lower than predetermined illuminance in a case where a detection value detected by the illuminance detection circuit is smaller than a predetermined value.

In addition, the timepiece according to the aspect of the present application may further include an illuminance detection circuit (30) that detects whether or not illuminance of light illuminating the solar panel is equal to or higher than the predetermined illuminance based on voltage values at both ends of the solar panel. The solar cell, the overcharge prevention circuit, and the illuminance detection circuit may be connected to each other in a parallel manner. In a case where the overcharge prevention circuit is detected not to be in an overcharge state, the control unit may determine that illuminance of light illuminating the solar panel with a first detection value detected by the illuminance detection circuit is lower than predetermined illuminance, and in a case where an overcharge state of the overcharge prevention circuit is detected, the control unit may determine that illuminance of light illuminating the solar panel with the first detection value detected by the illuminance detection circuit is equal to or higher than predetermined illuminance.

In addition, the timepiece according to the aspect of the present application may further include a display unit (40 or 40A). The predetermined illuminance may be illuminance for being able to supply electric power capable of driving the display unit.

According to another aspect of the present application, there is provided an electronic device including the timepiece according to any one of those described above.

According to further another aspect of the present application, there is provided a method of determining illuminance of a timepiece including a solar cell which has a solar panel, a secondary battery which is charged from the solar cell, and an overcharge prevention circuit which detects a charged state of the secondary battery. The method of determining illuminance of a timepiece includes a step of short-circuiting the solar cell and determining that illuminance of light illuminating the solar panel is equal to or higher than predetermined illuminance in a case where a control unit detects that the overcharge prevention circuit is in an overcharge state.

According to the present application, a power generation state of the solar cell can be accurately detected even if the secondary battery is in an overcharge state close to a full charge.

DETAILED DESCRIPTION OF THE PREFERRED EMBODIMENTS

Hereinafter, embodiments of the present invention will be described with reference to the drawings.

First Embodiment

Figure 1:
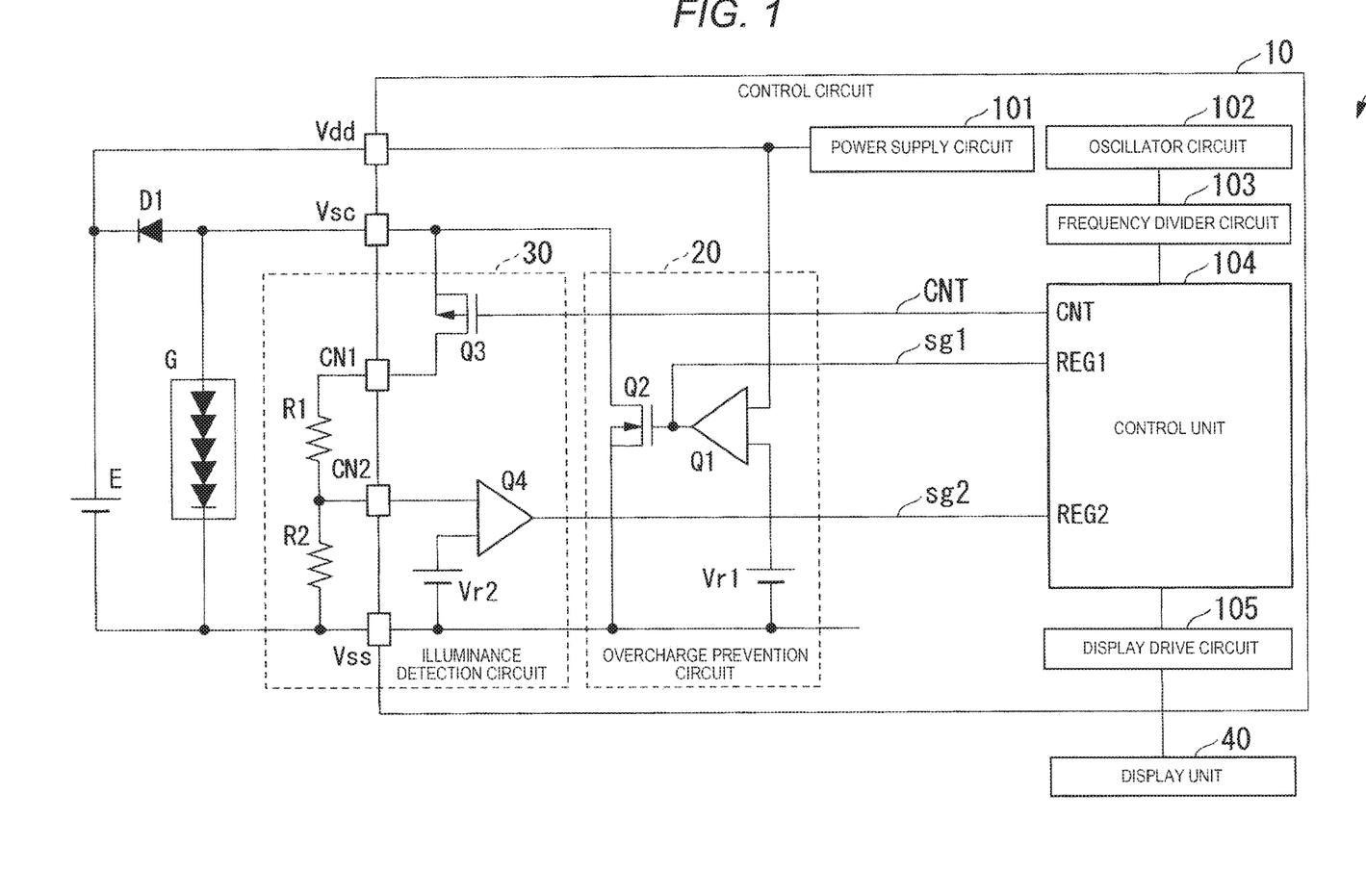
FIG. 1 is a block diagram illustrating an example of a configuration of a timepiece according to a first embodiment.

FIG. 1 is a block diagram illustrating an example of a configuration of a timepiece 1 (electronic device) according to the present embodiment. As illustrated in FIG. 1, the timepiece 1 includes a secondary battery E, a solar cell G, a diode D1, a resistor R1, a resistor R2, a control circuit 10, and a display unit 40.

In addition, the control circuit 10 includes a power supply circuit 101, an oscillator circuit 102, a frequency divider circuit 103, a control unit 104, a display drive circuit 105, an overcharge prevention circuit 20, and an illuminance detection circuit 30.

The overcharge prevention circuit 20 includes a comparator Q1, a switching element Q2, and a reference voltage source Vr1.

The illuminance detection circuit 30 includes a switching element Q3, a comparator Q4, and a reference voltage source Vr2.

The timepiece 1 illustrated in FIG. 1 is a digital timepiece in which the display unit 40 (liquid crystal or the like) displays a measured time. In addition, the timepiece 1 is a so-called solar timepiece, which is operated by light illuminating the solar cell G. In the embodiment, the timepiece 1 is described as an example of an electronic device.

First, a relationship of connection will be described.

In the secondary battery E, a positive electrode is connected to a cathode of the diode D1 and a power source terminal Vdd of the control circuit 10, and a negative electrode is earthed to Vss.

In the diode D1, an anode is connected to a positive electrode of the solar cell G and a terminal Vsc of the control circuit 10.

In the solar cell G, a negative electrode is earthed to the Vss.

In the resistor R1, one end is connected to a terminal CN1 of the control circuit 10, and the other end is connected to one end of the resistor R2 and a terminal CN2 of the control circuit 10.

The other end of the resistor R2 is earthed to the Vss.

The power source terminal Vdd of the control circuit 10 is connected to an input portion of the power supply circuit 101 and a first input portion of the comparator Q1.

The terminal Vsc of the control circuit 10 is connected to a drain terminal of the switching element Q2 and a source terminal of the switching element Q3. For example, the switching element Q2 is a metal oxide semiconductor field effect transistor (MOSFET) having N channels. For example, the switching element Q3 is a MOSFET having P channels.

The terminal CN1 of the control circuit 10 is connected to the drain terminal of the switching element Q3.

The terminal CN2 of the control circuit 10 is connected to a first input portion of the comparator Q4.

A terminal Vss of the control circuit 10 is earthed to the Vss.

In the comparator Q1, a second input portion is connected to a positive electrode of the reference voltage source Vr1, and an output portion is connected to an REG1 terminal of the control unit 104 and a gate terminal of the switching element Q2.

In the reference voltage source Vr1, a negative electrode is earthed to the Vss.

In the switching element Q2, a source terminal is earthed to the Vss.

In the switching element Q3, a gate terminal is connected to a CNT terminal of the control unit 104.

In the comparator Q4, a second input portion is connected to a positive electrode of the reference voltage source Vr2, and an output portion is connected to an REG2 terminal of the control unit 104.

In the reference voltage source Vr2, the negative electrode is earthed to the Vss.

In this way, the timepiece 1 has a configuration in which the solar cell G, the overcharge prevention circuit 20, and the illuminance detection circuit 30 are connected to each other in a parallel manner.

Next, constituent elements of the timepiece 1 will be described.

For example, the solar cell G has a solar panel. The solar cell G converts light energy into electric power and supplies converted electric power to the secondary battery E and the control circuit 10.

The diode D1 is inserted between the solar cell G and the secondary battery E to prevent a backflow from the secondary battery E to the solar cell G.

The secondary battery E is a storage battery storing electric energy supplied from the solar cell G. The secondary battery E supplies stored electric power to the control circuit 10.

The power supply circuit 101 generates an internal operation voltage of each of the circuits in the control circuit 10 by raising(boosting) or lowering an output voltage of the secondary battery E and supplies a generated internal operation voltage to each of the circuits. A value of a voltage supplied to the first input portion of the comparator Q1 of the overcharge prevention circuit 20 is a voltage value of the secondary battery E.

For example, the oscillator circuit 102 is a passive element which utilizes piezoelectric phenomena of crystal and is used to oscillate at a predetermined frequency from its mechanical resonance. Here, a predetermined frequency is 32 kHz, for example.

The frequency divider circuit 103 divides a signal, which is output by the oscillator circuit 102 and has a predetermined frequency, into desired frequencies and outputs the divided signal to the control unit 104.

The overcharge prevention circuit 20 compares the voltage value Vdd of the secondary battery E and a voltage value Vref1 of the reference voltage source Vr1. As a result of a comparison, in a case where the voltage value Vdd is equal to or greater than the voltage value Vref1, the overcharge prevention circuit 20 outputs a signal at an H (high) level to the REG1 terminal of the control unit 104 as an overcharge prevention signal sg1 indicating prevention of an overcharge. In addition, in a case where the voltage value Vdd is equal to or greater than the voltage value Vref1 as a result of a comparison, the overcharge prevention circuit 20 performs control such that electrodes of the solar cell G are short-circuited. As a result of a comparison, in a case where the voltage value Vdd is smaller than the voltage value Vref1, the overcharge prevention circuit 20 outputs the overcharge prevention signal sg1 at an L (low) level to the REG1 terminal of the control unit 104. The overcharge prevention circuit 20 is turned on when the secondary battery E is in a state close to a full charge.

The comparator Q1 compares the voltage value Vdd of the secondary battery E and the voltage value Vref1 of the reference voltage source Vr1. As a result of a comparison, in a case where the voltage value Vdd is equal to or greater than the voltage value Vref1, the comparator Q1 outputs a signal at the H level to the REG1 terminal of the control unit 104 as the overcharge prevention signal sg1. In addition, in a case where the voltage value Vdd is equal to or greater than the voltage value Vref1, the comparator Q1 outputs an H level signal to the gate terminal of the switching element Q2 and switches the switching element Q2 such that the electrodes of the solar cell G are short-circuited. In addition, in a case where the voltage value Vdd is smaller than the voltage value Vref1 as a result of a comparison, the comparator Q1 outputs the overcharge prevention signal sg1 at the L level to the REG1 terminal of the control unit 104.

It is assumed that the maximum value for a voltage value when the electrodes of the solar cell G are open is 3.6 V. In addition, a voltage value in a state where the solar cell G is not illuminated with light is 0 V. In this case, the voltage value Vref1 (which is also referred to as a reference voltage value Vref1) of the reference voltage source Vr1 is a voltage value within a range between 0 V to 3.6 V. The voltage value Vref1 of the reference voltage source Vr1 is an upper limit value for an allowable value of a voltage applied to the secondary battery E at the time of charging.

When a CNT signal of the control unit 104 is at the H level, the illuminance detection circuit 30 divides a voltage of the solar cell G through the resistor R1 and the resistor R2. The illuminance detection circuit 30 compares a divided voltage value and a voltage value Vref2 of the reference voltage source Vr2. In a case where a divided voltage value is equal to or greater than the voltage value Vref2 as a result of a comparison, the illuminance detection circuit 30 outputs a signal at the H level to the REG2 terminal of the control unit 104 as an illuminance detection signal sg2 indicating an illuminance detection result. In a case where a divided voltage value is smaller than the voltage value Vref2 as a result of a comparison, the illuminance detection circuit 30 outputs the illuminance detection signal sg2 at an L (low) level to the REG2 terminal of the control unit 104.

When the CNT signal of the control unit 104 is at the H level, the switching element Q3 is turned on. In this case, the terminal Vsc and one end of the resistor R1 are connected to each other. When the CNT signal of the control unit 104 is at the L level, the switching element Q3 is turned off. In this case, the terminal Vsc and one end of the resistor R1 are not connected to each other.

The comparator Q4 compares a voltage value of a voltage of the solar cell G divided through the resistor R1 and the resistor R2, and the voltage value Vref2 (which is also referred to as a reference voltage value Vref2) of the reference voltage source Vr2. In a case where a divided voltage value is equal to or greater than the voltage value Vref2 as a result of a comparison, the comparator Q4 outputs a signal at the H level to the REG2 terminal of the control unit 104 as the illuminance detection signal sg2. In addition, in a case where a divided voltage value is smaller than the voltage value Vref2 as a result of a comparison, the comparator Q4 outputs the illuminance detection signal sg2 at the L level to the REG2 terminal of the control unit 104. Here, the voltage value Vref2 of the reference voltage source Vr2 is a voltage value corresponding to predetermined illuminance. Predetermined illuminance is illuminance for being able to supply electric power capable of driving the display unit 40.

It is assumed that the maximum value for a voltage value when the electrodes of the solar cell G are open is 3.6 V. In addition, a voltage value in a state where the solar cell G is not illuminated with light is 0 V. In this case, the voltage value Vref2 of the reference voltage source Vr2 is a voltage value within a range between 0 V to 3.6 V.

The control unit 104 measures a time by using a signal having a frequency output by the frequency divider circuit 103 and outputs information of the measured time to the display drive circuit 105. In addition, the control unit 104 generates a timing of detecting illuminance by using a signal having a frequency output by the frequency divider circuit 103.

In a case where the overcharge prevention signal sg1, which is output by the overcharge prevention circuit 20 and indicates an overcharge state, is at the H level, the control unit 104 determines that the secondary battery E is in a charged state close to a full charge. In a case where the secondary battery E is determined to be in a charged state close to a full charge, the control unit 104 outputs the CNT signal at the L level to the illuminance detection circuit 30 and determines that illuminance is present based on the overcharge prevention signal sg1 without controlling the switching element Q3 to be turned on.

In a case where the overcharge prevention signal sg1 output by the overcharge prevention circuit 20 is at the L level, the control unit 104 controls the switching element Q3 to be turned on at a timing of measuring illuminance and determines whether or not illuminance is equal to or higher than predetermined illuminance based on the illuminance detection signal sg2 output by the comparator Q4. The control unit 104 determines that illuminance is equal to or higher than predetermined illuminance in a case where the illuminance detection signal sg2 is at the H level. The control unit 104 determines that illuminance is lower than predetermined illuminance in a case where the illuminance detection signal sg2 is at the L level. For example, in a case where illuminance lower than predetermined illuminance continues for a predetermined time or longer, the control unit 104 controls each of the circuits to be in a power saving mode. Here, a predetermined time is 30 minutes, for example. In the power saving mode, the display unit 40 is controlled not to perform displaying.

The display drive circuit 105 causes the display unit 40 to display information such as a time based on time information output by the control unit 104.

As an example, the display unit 40 is a liquid crystal display (LCD) device or an organic electroluminescence (EL) display device. The display drive circuit 105 causes the display unit 40 to display time information, residual quantity information of the secondary battery E, and information related to illuminance, for example.

Next, voltage values when the electrodes of the solar cell G are open and are short-circuited will be described.

Figure 2:
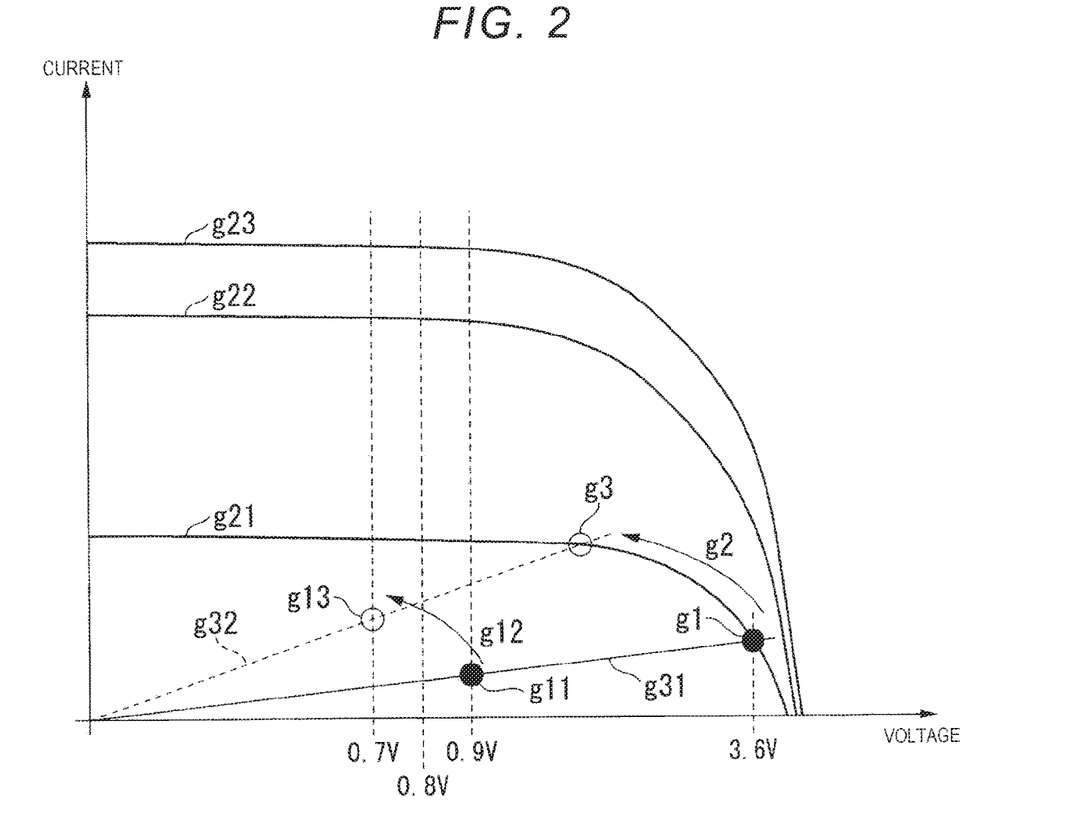
FIG. 2 is a view illustrating output characteristics (I-V curve) of a solar cell G.

FIG. 2 is a view illustrating output characteristics (I-V curve) of the solar cell G. In FIG. 2, the horizontal axis indicates a voltage, and the vertical axis indicates a current. In addition, FIG. 2 is a view illustrating changes in voltage V generated between the electrodes of the solar cell G in accordance with a load (output current I) connected to the solar cell G.

A curve g21 is output characteristics of a solar cell in a case of first illuminance and indicates that electric power changes in accordance with an obtained connected load. In addition, the curve g21 is voltage-to-current characteristics in which a current value when an output voltage value is 0 V indicates a short circuit current when both ends of the solar cell are short-circuited, an output voltage rises if resistance of a load connected to the solar cell gradually increases from 0 Ω, and a voltage value when an output current value having resistance of a load corresponding to infinity is 0 A indicates an open voltage when both ends of the solar cell are open. A curve g22 is output characteristics of the solar cell G in a case of second illuminance higher than the first illuminance. A curve g23 output characteristics of the solar cell G in a case of third illuminance higher than the second illuminance.

A straight line g31 expresses an image of a load line when the electrodes of the solar cell G are open. A point g1 is an output voltage (of the terminal Vsc and the terminal CN1) of the solar cell G, and a point g11 indicates a voltage (of the terminal CN2) divided through the resistor R1 and the resistor R2. A straight line g32 expresses an image of a load line when the electrodes of the solar cell G are short-circuited.

If the electrodes of the solar cell G are short-circuited by the overcharge prevention circuit 20 in a case where illuminance is high, in an output voltage of the solar cell G when being detected by the illuminance detection circuit 30, as indicated with an arrow g2 in FIG. 2, a voltage value (point g3) at the time of being short-circuited becomes smaller than a voltage value (point g1) at the time of being open.

For example, if the electrodes of the solar cell G are short-circuited in a case where illuminance is low (approximately 200 lux), in a voltage of the terminal CN2 input to the comparator Q4 when being detected by the illuminance detection circuit 30, as indicated with an arrow g12 in FIG. 2, a voltage value (point g13) at the time of being short-circuited becomes smaller than the voltage value (point g11) at the time of being open. Here, it is assumed that the reference voltage value Vref2 (first detection value) is 0.8 V. In this case, if the electrodes of the solar cell G are in an open state, a voltage value input to the comparator Q4 becomes 0.9 V, for example, which is higher than 0.8 V, that is, the reference voltage value Vref2 (first detection value). Accordingly, the voltage value is determined to be equal to or higher than predetermined illuminance. However, if the electrodes of the solar cell G are in a short circuit state, a voltage value input to the comparator Q4 becomes 0.7 V, for example, which is lower than 0.8 V, that is, the reference voltage value Vref2 (first detection value). Accordingly, in a technique in the related art, the voltage value is erroneously determined to be lower than predetermined illuminance. Therefore, in the present embodiment, in a case where an overcharge state is detected, illuminance is determined to be equal to or higher than predetermined illuminance.

Next, an example of a procedure of processing performed by the timepiece 1 will be described.

Figure 3:
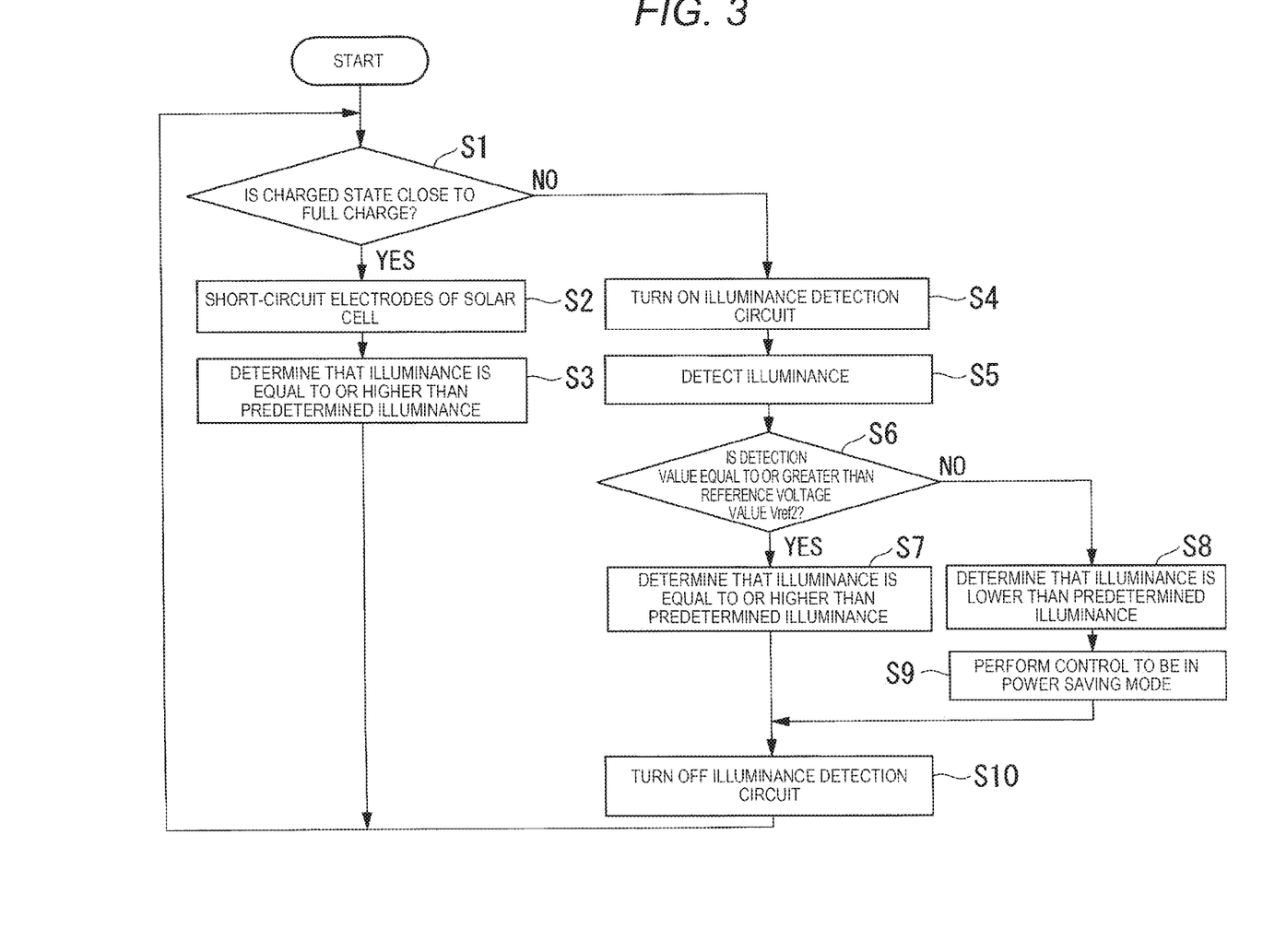
FIG. 3 is a flowchart illustrating an example of a procedure of processing performed by the timepiece according to the first embodiment.

FIG. 3 is a flowchart illustrating an example of a procedure of processing performed by the timepiece 1 according to the present embodiment. It is assumed that, in an initial state, the control unit 104 outputs the CNT signal at the H level (the switching element Q3 is turned off).

(Step S1) The control unit 104 acquires the overcharge prevention signal sg1 output by the overcharge prevention circuit 20. Subsequently, the control unit 104 determines whether or not the secondary battery E is in a charged state close to a full charge based on whether the overcharge prevention signal sg1 is at the H level or the L level. In a case where the secondary battery E is determined to be in a charged state close to a full charge (Step S1; YES), the control unit 104 proceeds to processing of Step S2. In a case where the secondary battery E is determined not to be in a charged state close to a full charge (Step S1; NO), the control unit 104 proceeds to processing of Step S4.

(Step S2) The comparator Q1 of the overcharge prevention circuit 20 performs control such that the electrodes of the solar cell G are short-circuited, by controlling the switching element Q2 to be turned on. In the present embodiment, this state is referred to as a state where the overcharge prevention circuit 20 is turned on. The control unit 104 proceeds to processing of Step S3.

(Step S3) Since the overcharge prevention signal sg1 is at the H level, the control unit 104 determines that illuminance is equal to or higher than predetermined illuminance, that is, illuminance is present. In this case, the control unit 104 does not control each of the constituent elements of the timepiece 1 to be in the power saving mode. After the processing, the control unit 104 returns to the processing of Step S1.

(Step S4) At a timing of detecting illuminance, the control unit 104 controls the illuminance detection circuit 30 to be turned on by outputting the CNT signal at the L level. Accordingly, the switching element Q3 of the illuminance detection circuit 30 is switched over to an ON state. In a case where the overcharge prevention signal sg1 is at the L level, the control unit 104 controls the switching element Q2 to be turned off, and a short circuit between the electrodes of the solar cell G is canceled. After the processing, the control unit 104 proceeds to processing of Step S5.

(Step S5) The comparator Q4 detects illuminance by comparing a voltage value of a voltage of the solar cell G divided through the resistor R1 and the resistor R2, and the reference voltage value Vref2 of the reference voltage source Vr2. In a case where the divided voltage value is equal to or greater than the reference voltage value Vref2 as a result of a comparison between the divided voltage value and the reference voltage value Vref2, the comparator Q4 outputs the illuminance detection signal sg2 at the H level to the control unit 104. Alternatively, in a case where the divided voltage value is smaller than the reference voltage value Vref2, the comparator Q4 outputs the illuminance detection signal sg2 at the L level to the control unit 104. After the processing, the control unit 104 proceeds to processing of Step S6.

(Step S6) In a case where the comparator Q4 outputs the illuminance detection signal sg2 at the H level, that is, in a case where a detection value is equal to or greater than the reference voltage value Vref2 (Step S6; YES), the control unit 104 proceeds to processing of Step S7. In a case where the comparator Q4 outputs the illuminance detection signal sg2 at the L level, that is, in a case where the detection value is smaller than the reference voltage value Vref2 (Step S6; NO), the control unit 104 proceeds to processing of Step S8.

(Step S7) The control unit 104 determines that illuminance is equal to or higher than predetermined illuminance and proceeds to processing of Step S10.

(Step S8) The control unit 104 determines that illuminance is lower than predetermined illuminance and proceeds to processing of Step S9.

(Step S9) The control unit 104 controls each of the constituent elements of the timepiece 1 to be in the power saving mode. After the processing, the control unit 104 proceeds to processing of Step S10. In a case where a state of no illuminance continues for a predetermined time, the control unit 104 may perform control to be in the power saving mode.

(Step S10) The control unit 104 controls the illuminance detection circuit 30 to be turned off by outputting the CNT signal at the H level. Accordingly, the switching element Q3 of the illuminance detection circuit 30 is switched over from an ON state to an OFF state. After the processing, the control unit 104 returns to the processing of Step S1.

As described by using FIG. 3, in the present embodiment, illuminance is detected to be equal to or higher than predetermined illuminance when an overcharge state of the overcharge prevention circuit 20 is detected, and illuminance is detected to be equal to or higher than predetermined illuminance or lower than predetermined illuminance by using the illuminance detection circuit 30 when being not in an overcharge state. Consequently, according to the present embodiment, in a case where the solar cell G is sufficiently illuminated, it is possible to suitably determine that illuminance is equal to or higher than predetermined illuminance.

Here, for example, in a case where the timepiece 1 is located under a sleeve of clothes or the like and the solar cell G is blocked from being illuminated, it is desired to immediately restart a time display operation in a case where the timepiece 1 is exposed from the sleeve. Therefore, even in the power saving mode, the control unit 104 may perform illuminance detection once every two seconds, for example.

During a normal operation, the control unit 104 may perform illuminance detection once a second, for example.

Figure 4:
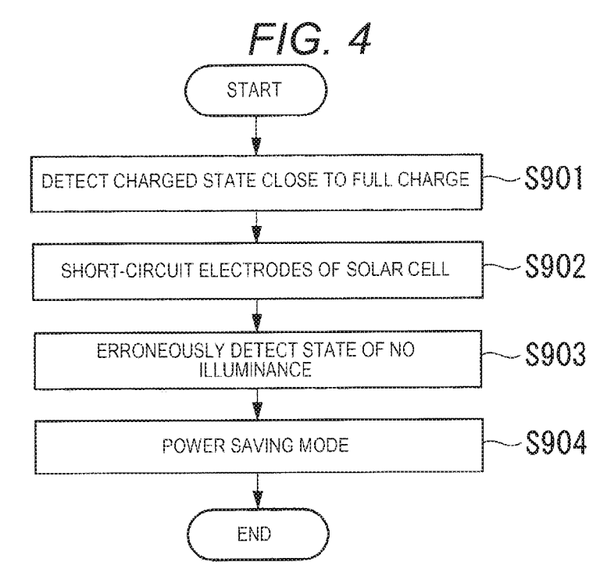
FIG. 4 is a flowchart in a case where illuminance is detected while electrodes of a solar cell are short-circuited in a case where an overcharge occurs according to a technology in the related art.

Here, an example of processing in a case where illuminance is detected while electrodes of a solar cell are short-circuited in a case where an overcharge occurs as in the related art will be described.

FIG. 4 is a flowchart in a case where illuminance is detected while electrodes of a solar cell are short-circuited in a case where an overcharge occurs according to a technology in the related art. It is assumed that the configuration of a timepiece according to a technology in the related art is the same as that of the timepiece 1 in FIG. 1, for example.

(Step S901) A control unit detects that a secondary battery is in an overcharge state close to a full charge based on a signal output by a comparator of an overcharge prevention circuit.

(Step S902) The control unit performs control such that the electrodes of the solar cell are short-circuited, by controlling the overcharge prevention circuit. In this case, as described by using FIG. 2, since the electrodes of the solar cell are short-circuited, a voltage value of the solar cell is lower than an actual voltage value.

(Step S903) The control unit erroneously detects that illuminance is lower than predetermined illuminance based on a signal output by the comparator of an illuminance detection circuit.

(Step S904) The control unit controls each of the constituent elements of a timepiece to be in the power saving mode.

In this way, in technologies in the related art, if illuminance detection is performed when the secondary battery is in an overcharge state close to a full charge, a voltage value of the solar cell becomes lower than an actual voltage value. Accordingly, illuminance is erroneously detected to be lower than predetermined illuminance. The timepiece is controlled to be in the power saving mode due to the erroneous detection. Here, in a case where the secondary battery is in an overcharge state close to a full charge, the solar cell is illuminated with sufficient quantity of light, thereby being in a state where sufficient power generation is performed. That is, actually, illuminance is in a state equal to or higher than predetermined illuminance.

On the other hand, in the present embodiment, in a case where an overcharge state close to a full charge is detected, the control unit determines that illuminance is equal to or higher than predetermined illuminance based on a detection result of the overcharge prevention circuit 20, instead of a detection result of the illuminance detection circuit 30. Consequently, according to the present embodiment, even if the secondary battery E is in an overcharge state close to a full charge, a power generation state of the solar cell G can be accurately detected.

In this way, in the related art, there has been a problem in that if illuminance detection is performed during an operation of the overcharge prevention circuit while the secondary battery is in a full charge state, illuminance is erroneously detected and shifts to the power saving mode even though power generation is performed. According to the embodiment, it is possible to prevent a shift to the power saving mode caused due to erroneous determination of illuminance detection occurring during an operation of the overcharge prevention circuit in a full charge state.

In FIG. 1, an example in which the timepiece 1 is a digital timepiece has been described. However, the timepiece may be an analog timepiece.

Figure 5:
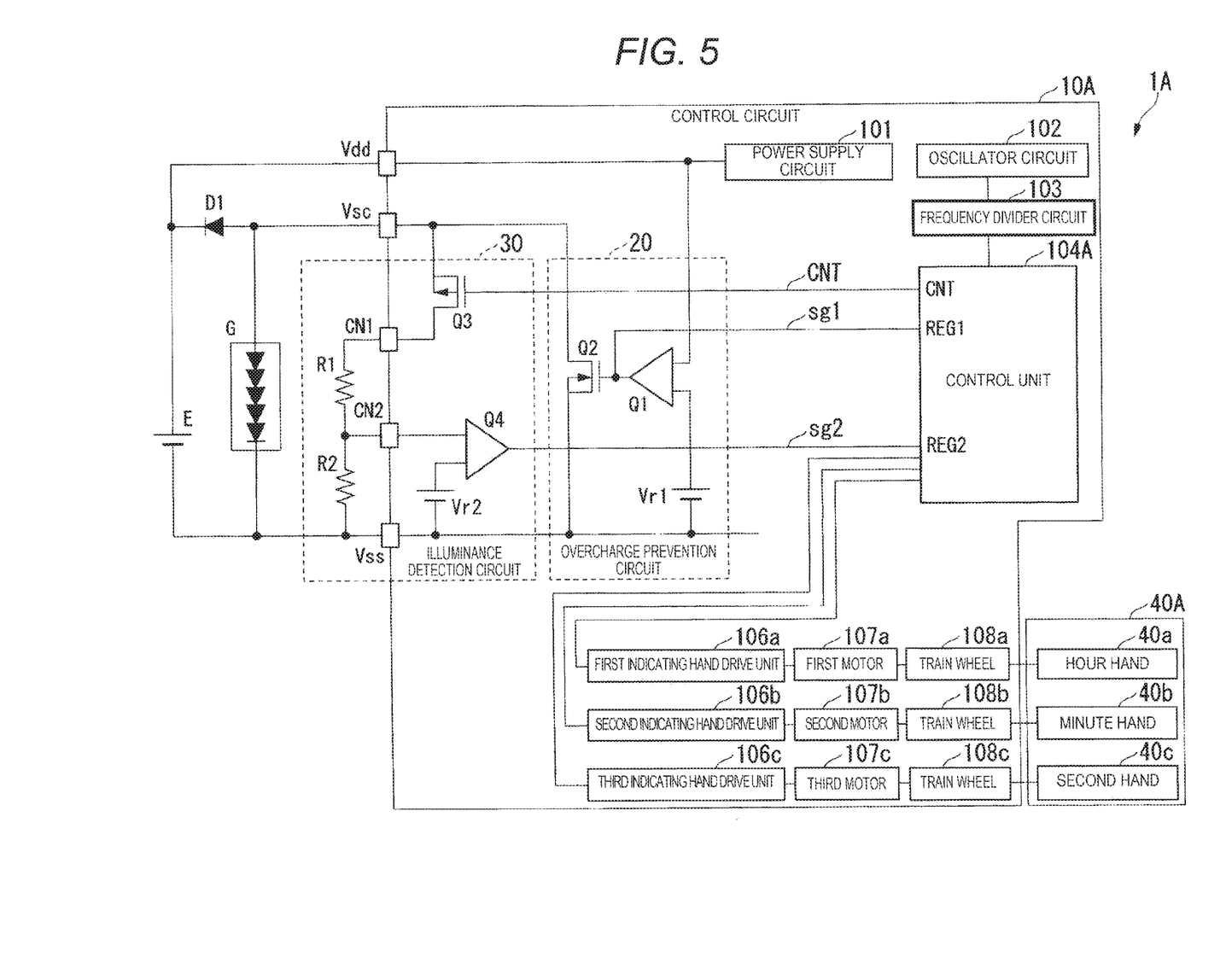
FIG. 5 is a block diagram illustrating an example of a configuration in a case where the timepiece according to the first embodiment is a digital timepiece.

FIG. 5 is a block diagram illustrating an example of a configuration of a case where a timepiece 1A according to the present embodiment is an analog timepiece. As illustrated in FIG. 5, the timepiece 1A includes the secondary battery E, the solar cell G, the diode D1, the resistor R1, the resistor R2, a control circuit 10A, and a display unit 40A.

The display unit 40A includes an hour hand 40a, a minute hand 40b, and a second hand 40c.

The control circuit 10A includes the power supply circuit 101, the oscillator circuit 102, the frequency divider circuit 103, a control unit 104A, the overcharge prevention circuit 20, the illuminance detection circuit 30, a first indicating hand drive unit 106a, a second indicating hand drive unit 106b, a third indicating hand drive unit 106c, a first motor 107a, a second motor 107b, a third motor 107c, a train wheel 108a, a train wheel 108b, and a train wheel 108c. The same reference signs are applied to constituent elements having the same function as those of the timepiece 1, and description thereof will not be repeated.

The timepiece 1A illustrated in FIG. 5 is an example of an analog timepiece including the hour hand 40a, the minute hand 40b, and the second hand 40c. The number of indicating hands is not limited to three. The indicating hand may be one, four, or more. In addition, the timepiece 1A may further include the display drive circuit 105 and the display unit 40 which is a display unit (liquid crystal or the like).

Similar to the control unit 104, the control unit 104A performs overcharge prevention processing and illuminance detection processing. In addition, the control unit 104A controls the first indicating hand drive unit 106a, the second indicating hand drive unit 106b, and the third indicating hand drive unit 106c in accordance with information of a measured time.

The first indicating hand drive unit 106a generates a pulse signal for forward rotation or reverse rotation of the first motor 107a in response to control of the control unit 104A. The first indicating hand drive unit 106a drives the first motor 107a in accordance with a generated pulse signal.

The second indicating hand drive unit 106b generates a pulse signal for forward rotation or reverse rotation of the second motor 107b in response to control of the control unit 104A. The second indicating hand drive unit 106b drives the second motor 107b in accordance with a generated pulse signal.

The third indicating hand drive unit 106c generates a pulse signal for forward rotation or reverse rotation of the third motor 107c in response to control of the control unit 104A. The third indicating hand drive unit 106c drives the third motor 107c in accordance with a generated pulse signal.

For example, each of the first motor 107a, the second motor 107b, and the third motor 107c is a stepping motor. The first motor 107a drives the hour hand 40a via the train wheel 108a in accordance with a pulse signal output by the first indicating hand drive unit 106a. The second motor 107b drives the minute hand 40b via the train wheel 108b in accordance with a pulse signal output by the second indicating hand drive unit 106b. The third motor 107c drives the second hand 40c via the train wheel 108c in accordance with a pulse signal output by the third indicating hand drive unit 106c.

Each of the train wheel 108a, the train wheel 108b, and the train wheel 108c is configured to include at least one gear. For example, the train wheel 108c is configured such that the second hand 40c makes one rotation in 60 steps, and the train wheel 108b is configured such that the minute hand 40b makes one rotation in 360 steps.

Each of the hour hand 40a, the minute hand 40b, and the second hand 40c is rotatably supported by a support body (not illustrated).

In a case where illuminance is determined to be lower than predetermined illuminance, the control unit 104A stops a hand operation of the second hand 40c and displays a current time by performing only hand operations of the hour hand 40a and the minute hand 40b, thereby performing control to be in the power saving mode by changing a hand operation cycle from a one-second cycle of second hand to a ten-second cycle of minute hand, for example. Alternatively, for example, the control unit 104A may perform control to be in the power saving mode by stopping hand operations of the hour hand 40a and the minute hand 40b.

Even in the timepiece 1A which is an analog timepiece illustrated in FIG. 5, similar to the timepiece 1, even if the secondary battery E is in an overcharge state close to a full charge, it is possible to accurately detect the charged state.

Second Embodiment

In the first embodiment, an example in which illuminance is detected to be equal to or higher than predetermined illuminance when an overcharge state of the overcharge prevention circuit 20 is detected, and illuminance is detected to be equal to or higher than predetermined illuminance or lower than predetermined illuminance by using the illuminance detection circuit 30 when being not in an overcharge state has been described. However, detection and determination of illuminance are not limited thereto.

The configuration (FIG. 1) of the timepiece 1 in a second embodiment is similar to that in the first embodiment, or the configuration (FIG. 5) of the timepiece 1A is similar to that in the first embodiment. In the following example, an example of a procedure of processing will be described by using the configuration of the timepiece 1. In a case where the configuration is that of the timepiece 1A, the control unit 104A performs the processing of the control unit 104.

Figure 6:
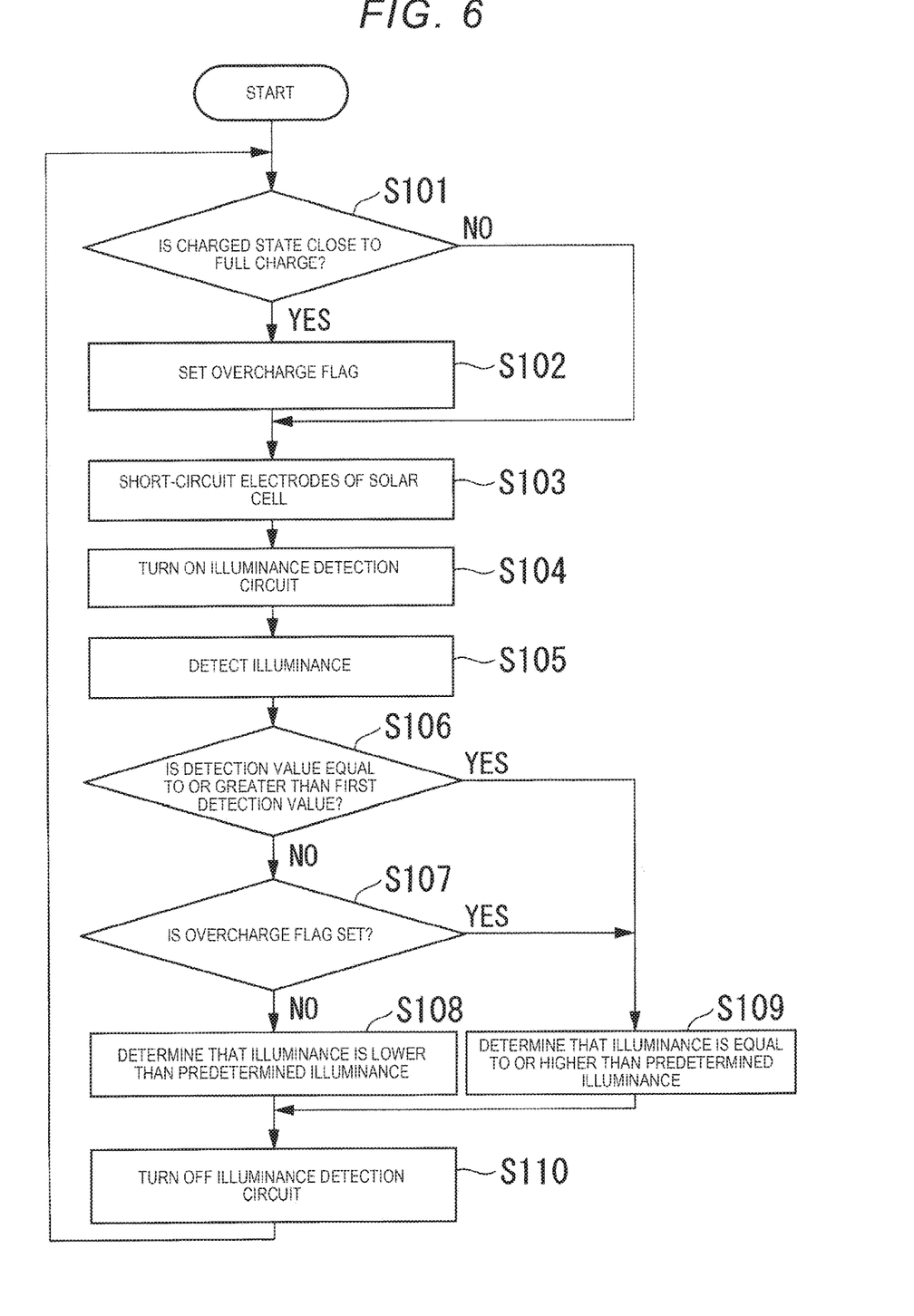
FIG. 6 is a flowchart illustrating an example of a procedure of processing performed by a timepiece according to a second embodiment.

FIG. 6 is a flowchart illustrating an example of a procedure of processing performed by the timepiece 1 according to the present embodiment. It is assumed that, in an initial state, the control unit 104 outputs the CNT signal at the H level.

(Step S101) The control unit 104 acquires the overcharge prevention signal sg1 output by the overcharge prevention circuit 20. Subsequently, the control unit 104 determines whether or not the secondary battery E is in a charged state close to a full charge based on whether the overcharge prevention signal sg1 is at the H level or the L level. In a case where the secondary battery E is determined to be in a charged state close to a full charge (Step S101; YES), the control unit 104 proceeds to processing of Step S102. In a case where the secondary battery E is determined not to be in a charged state close to a full charge (Step S101; NO), the control unit 104 proceeds to processing of Step S103.

(Step S102) The control unit 104 sets an overcharge flag and proceeds to processing of Step S103.

(Step S103) The comparator Q1 of the overcharge prevention circuit 20 performs control such that the electrodes of the solar cell G are short-circuited, by controlling the switching element Q2 to be turned on. The control unit 104 proceeds to processing of Step S104.

(Step S104) At a timing of detecting illuminance, the control unit 104 controls the illuminance detection circuit 30 to be turned on by outputting the CNT signal at the L level. Accordingly, the switching element Q3 of the illuminance detection circuit 30 is switched over to an ON state. After the processing, the control unit 104 proceeds to processing of Step S105.

(Step S105) The comparator Q4 detects illuminance by comparing a voltage value of a voltage of the solar cell G divided through the resistor R1 and the resistor R2, and the first detection value (reference voltage value Vref2) of the reference voltage source Vr2. As an example, the first detection value is a voltage value of 0.8 V corresponding to 200 lux. After the processing, the control unit 104 proceeds to processing of Step S106.

(Step S106) In a case where the comparator Q4 outputs the illuminance detection signal sg2 at the H level, that is, in a case where a detection value is equal to or greater than the first detection value (reference voltage value Vref2) (Step S106; YES), the control unit 104 proceeds to processing of Step S109. In a case where the comparator Q4 outputs the illuminance detection signal sg2 at the L level, that is, in a case where the detection value is smaller than the first detection value (reference voltage value Vref2) (Step S106; NO), the control unit 104 proceeds to processing of Step S107.

(Step S107) The control unit 104 determines whether or not an overcharge flag is set. In a case where an overcharge flag is determined to be set (Step S107; YES), the control unit 104 proceeds to processing of Step S109. In a case where an overcharge flag is determined not to be set (Step S107; NO), the control unit 104 proceeds to processing of Step S108.

(Step S108) The control unit 104 determines that illuminance is lower than predetermined illuminance and proceeds to processing of Step S110.

(Step S109) The control unit 104 determines that illuminance is equal to or higher than predetermined illuminance and proceeds to processing of Step S110. Similar to the first embodiment, in a case where a state of illuminance lower than predetermined illuminance continues for a predetermined time, the control unit 104 controls the timepiece 1 to be in the power saving mode.

(Step S110) The control unit 104 controls the illuminance detection circuit 30 to be turned off by outputting the CNT signal at the H level. Accordingly, the switching element Q3 of the illuminance detection circuit 30 is switched over from an ON state to an OFF state. After the processing, the control unit 104 returns to the processing of Step S101.

As described above, in the present embodiment, an overcharge flag is set when an overcharge state of the overcharge prevention circuit 20 is detected. In the present embodiment, in regard to the first detection value detected by the illuminance detection circuit 30, when being in an overcharge state, that is, in a case where an overcharge flag is set, even if an illuminance detection value is erroneously detected to be smaller than the first detection value, the illuminance detection value is determined to be equal to or higher than predetermined illuminance. Consequently, according to the present embodiment, in a case where the solar cell G is sufficiently illuminated, it is possible to suitably determine that illuminance is equal to or higher than predetermined illuminance. In addition, in the present embodiment as well, similar to the first embodiment, it is possible to prevent a shift to the power saving mode caused due to erroneous determination of illuminance detection occurring during an operation of the overcharge prevention circuit 20 in a full charge state.

The control unit 104 (or 104A) may perform all or a part of the processing by recording a program for realizing all or a part of the functions of the control unit 104 (or 104A) according to the present invention in a computer readable recording medium, causing a computer system to read the program recorded in this recording medium, and executing the program. Here, it is assumed that "the computer system" includes hardware such as an OS and peripherals. In addition, it is assumed that "the computer system" also includes the WWW system with a homepage provided environment (or a display environment). In addition, "the computer readable recording medium" denotes a storage device such as a portable medium (flexible disk, magneto-optical disk, ROM, CD-ROM, and the like), and a hard disk built into the computer system. Moreover, it is assumed that "the computer readable recording medium" also includes a memory which retains a program for a certain period of time like a volatile memory (RAM) inside the computer system serving as a server or a client in a case where a program is transmitted via a network such as the internet or a communication channel such as a telephone line.

In addition, the above-described program may be transmitted to another computer system from the computer system storing this program in a storage device or the like via a transmission medium, or through transmission waves in the transmission medium. Here, "the transmission medium" transmitting a program denotes a medium having a function of transmitting information like a network (communication network) such as the internet, or a communication channel (communication line) such as a telephone line. In addition, the above-described program may be a program for realizing a part of the above-described functions. Moreover, the above-described program may be a program which can realize the above-described functions by being combined with a program which has already been recorded in the computer system, or a so-called differential file (differential program).

Hereinabove, forms for performing the present invention have been described by using the embodiments. However, the present invention is not limited to such embodiments in any way, and various modifications and replacements can be added within a scope not departing from the gist of the present invention.

What is claimed is:
1. A timepiece comprising:
a solar cell that has a solar panel;
a secondary battery that is charged from the solar cell;
an overcharge prevention circuit configured to detect a charged state of the secondary battery;
an illuminance detection circuit configured to detect, based on a voltage across end terminals of the solar panel, whether or not light illuminating the solar panel is equal to or higher than a predetermined illuminance, wherein the solar cell, the overcharge prevention circuit, and the illuminance detection circuit are connected in a parallel between a power source terminal and an earthed terminal; and
a control unit configured to short-circuit the solar cell upon determination by the overcharge prevention circuit that the secondary battery is close to being overcharged, wherein upon determination by the overcharge prevention circuit that the secondary battery is close to being overcharged, the control unit is configured to regard light illuminating the solar panel as being equal to or higher than the predetermined illuminance, whereas upon determination by the overcharge prevention circuit that the secondary battery is not close to being overcharged, the control unit is configured to cause the illuminance detection circuit to determine whether or not light illuminating the solar panel is equal to or higher than the predetermined illuminance.

2. The timepiece according to claim 1, wherein upon determination by the overcharge prevention circuit that the secondary battery is not close to being overcharged, the control unit is configured to regard the light illuminating the solar panel as being equal to or higher than the predetermined illuminance when the illuminance detection circuit determines that the light illuminating the solar panel is equal to or higher than the predetermined illuminance, whereas upon determination by the overcharge prevention circuit that the secondary battery is not close to being overcharged, the control unit is configured to regard the light illuminating the solar panel as being smaller than the predetermined illuminance when the illuminance detection circuit determines that the light illuminating the solar panel is lower than the predetermined illuminance.

3. The timepiece according to claim 1, wherein upon determination by the overcharge prevention circuit that the secondary battery is not close to being overcharged, the control unit is configured to regard the light illuminating the solar panel as being lower than the predetermined illuminance, whereas upon determination by the overcharge prevention circuit that the secondary battery is close to being overcharged, the control unit is configured to regard the light illuminating the solar panel as being equal to or higher than the predetermined illuminance.

4. The timepiece according to claim 1, further comprising a display unit, wherein the predetermined illuminance is illuminance for being able to supply electric power capable of driving the display unit.

5. An electronic device comprising the timepiece according to claim 1.

* * * * *